March 24, 1959 J. J. PARKER ET AL 2,879,067
CHUCK FOR SPLINED ARTICLES
Filed May 16, 1957
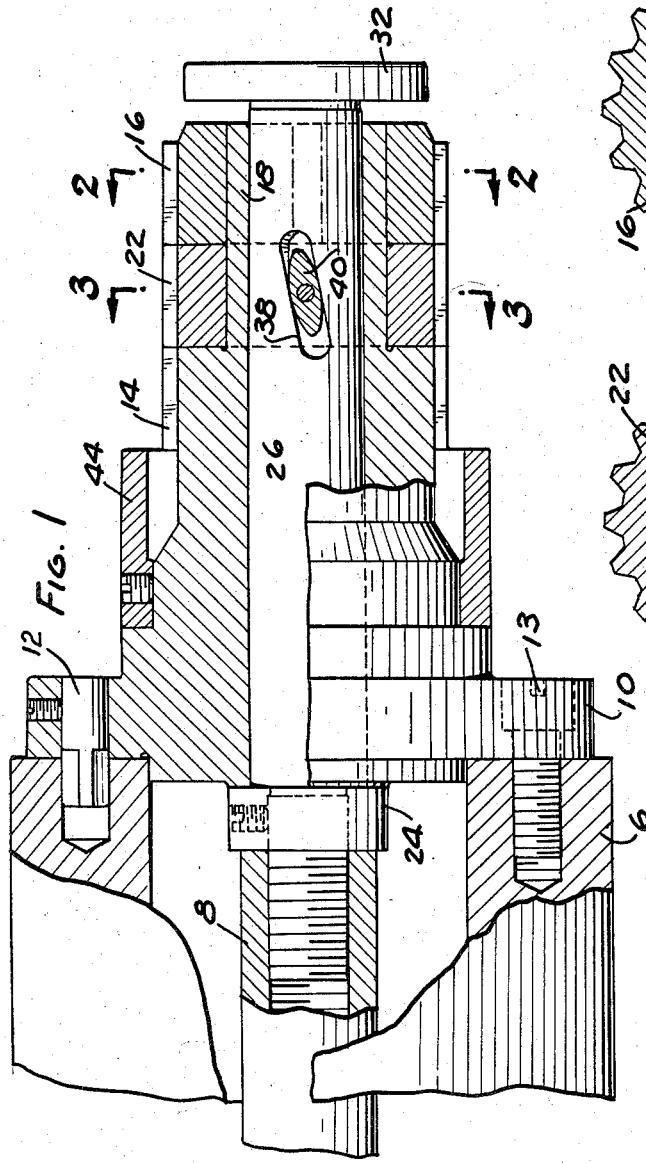
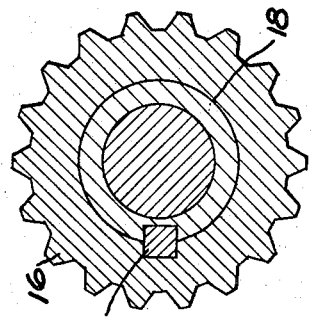
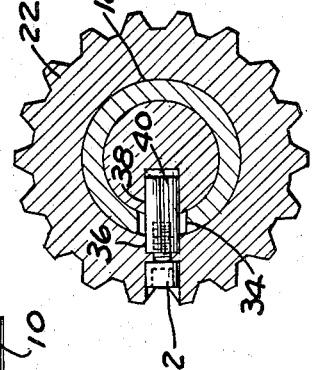
INVENTORS
JOHN J. PARKER & LONDON T. MORAWSKI
BY
ATTORNEYS.

United States Patent Office 2,879,067
Patented Mar. 24, 1959

2,879,067

CHUCK FOR SPLINED ARTICLES

John J. Parker and London T. Morawski, Detroit, Mich.

Application May 16, 1957, Serial No. 659,546

3 Claims. (Cl. 279—1)

This invention relates to chucks for holding splined work pieces. In our Patent 2,658,764 there is disclosed such a chuck in which those parts which have to be custom machined to suit a particular work piece design are provided in a sub-assembly which may be easily removed from the remainder of the chuck and replaced by a different sub-assembly suited for other work pieces. In the device there disclosed, the work piece is held by means of a rockable toothed member which is twisted out of alignment with a stationary toothed member so as to apply opposing torques through opposite side faces of the splined teeth in the work piece. The rockable member in this prior construction is positioned axially alongside the stationary work engaging teeth and where the dimensional tolerances allowed from piece to piece are not very small, there is the possibility of cocking of the work piece due to the unsymmetrical application of the chucking torque.

It is an object of the present invention to provide an improved chuck for holding splined work pieces wherein any tendency for the work piece to become cocked by the chucking torque is avoided.

Another object is to provide a chuck of this character which may be constructed economically and operated by a simpler mechanism than prior devices of this type.

Further objects and advantages of the present invention will be apparent from the following description, reference being had to the accompanying drawing wherein a preferred form of the present invention is illustrated.

In the drawing:

Fig. 1 is a longitudinal cross section of a splined work piece holder embodying a preferred form of the present invention.

Fig. 2 is a cross section on line 2—2 of Fig. 1.

Fig. 3 is a cross section on line 3—3 of Fig. 1.

In the device disclosed in the drawings, a work spindle 6 has a longitudinally shiftable operating rod 8 positioned centrally thereof. A chuck body 10 is conformed on its left hand end to be received by a dowel pin 12 and screws 13 on the end of spindle 6. The body 10 may be similar in this respect to the body 32 in our prior patent heretofore identified, although the chuck actuating means may be different as will appear. Formed on the body 10 is a first work engaging toothed member 14 which may be integral therewith. A second work engaging toothed member 16 is also formed on the body 10 and spaced axially from the member 14 a predetermined distance. The member 16 is carried upon a tubular support 18 which also is formed integrally with the body 10. A key 20 serves to prevent rotation of the member 16.

Mounted between the stationary toothed members 14 and 16 is a rockable work engaging toothed member 22 which is journalled upon the tubular support 18. A longitudinally shiftable actuating member comprises a shaft 26 threaded at its left end to rod 8 and carrying a stop collar 24. At its right hand end the shaft 26 has an integral flange 32. The tubular support 18 has a radial aperture 34 in its side wall and intermediate the two stationary toothed members. A keyway 36 in the member 22 and a keyway 38 in the shaft 26 are in alignment with the aperture 34. One of the keyways, in this case 38, is formed along a helix. A radially extending driving key 40 is mounted in these two keyways and is retained by a screw 42 in the rockable member 22. The aperture 34 has a circumferential clearance between its sides and the key 40 as shown in Fig. 2. A work engaging stop sleeve 44 may be mounted upon the body to assist in locating work pieces on the chuck.

In operation, with the operating rod in released position, the three toothed elements 14, 16, and 22 will have their teeth in alignment and a work piece may be removed from or placed upon these teeth. With a work piece in position on the chuck, the operating rod and shaft 26 are then shifted to the left to engaging position which causes a helical camming action to occur between keyway 38 and key 40. The driving key 40 thus rocks the work engaging toothed member 22 placing a chucking torque upon the teeth of the work piece to tightly hold the same for a machining operation.

It will be seen that the torque applied to the work piece by the rockable member 22 and the counter torque applied by the stationary members 14 and 16 is applied symmetrically so far as the axial length of the work piece is concerned. It will be understood of course that the total length of the three toothed members is substantially equal to the length of the spline bore in the particular work pieces being handled. Thus, there is no tendency for a work piece to become cocked upon the chuck axis. When the work piece has been machined, the operating rod is again released permitting it to be removed from the chuck.

It will thus be seen that the present invention provides an improved holder for splined work pieces in which torque is applied through the splined teeth in a manner which is symmetrical not only around the circumference but also in an axial aspect as well.

Likewise, the construction of the chuck embodies relatively few parts and these of comparatively simple construction.

While the form of embodiment of the invention as herein disclosed constitutes a preferred form, it is to be understood that other forms might be adopted, all coming within the scope of the claims which follow.

What is claimed is as follows:

1. A chuck for holding splined work pieces comprising a body member, an inner work engaging member having teeth and mounted on the body, an outer work engaging member having teeth aligned with the first teeth and mounted on the body in axially spaced and rotatably fixed relation to the first member, a tubular support forming the connection between said members and rigidly securing them together, a rotatably fixed and longitudinally movable shaft extending into the tubular support, a rockable work engaging toothed member mounted on the tubular support between the first two members, the inner periphery of said rockable member and the outer periphery of said shaft having radially registering key-ways therein, said tubular support having a through aperture therein registering with said key-ways, one of said key-ways being helical and the other having a key fixed therein and extending through said through aperture into the helical key-way, said helical key-way having an axial extent greater than said key whereby the rockable toothed member is caused to rock in response to longitudinal movement of said shaft.

2. The combination called for in claim 1 wherein said helical key-way is formed on said shaft and said key is fixedly secured in the key-way on the rockable toothed member.

3. The combination called for in claim 2 wherein said through aperture in said tubular support has a circumferential extent greater than the width of said key to permit circumferential displacement of the key relative to the tubular support in response to longitudinal movement of said shaft.

References Cited in the file of this patent

UNITED STATES PATENTS

| | | |
|---|---|---|
| 2,445,184 | Parker et al. | July 13, 1948 |
| 2,665,136 | Fallon | Jan. 5, 1954 |
| 2,762,629 | Dalby | Sept. 11, 1956 |